United States Patent Office 3,736,284
Patented May 29, 1973

3,736,284
METAL COATING COMPOSITIONS PREPARED FROM AQUEOUS DISPERSIONS OF A CARBOXYL CONTAINING OLEFIN COPOLYMER AND A MODIFIED UREA FORMALDEHYDE RESIN
Chester W. Fitko, Chicago, Ill., assignor to Continental Can Company, Inc., New York, N.Y.
No Drawing. Filed June 19, 1972, Ser. No. 264,125
Int. Cl. C08g 51/24
U.S. Cl. 260—29.4 UA        8 Claims

ABSTRACT OF THE DISCLOSURE

Metal surfaces are coated with an aqueous dispersion of a water dispersible carboxyl containing olefin copolymer and a heat-curable, thermosetting modified urea formaldehyde resin, namely alkylated urea formaldehyde condensates and methylolated alkeneureas.

BACKGROUND OF THE INVENTION

(1) Field of the invention

This invention is related to the coating of metal articles, and more particularly to coating metal articles with aqueous dispersions of carboxyl containing olefin copolymers.

(2) The prior art

In the manufacture of metal containers, a protective synthetic resin coating is applied to the interior of the container. The synthetic resins which are employed for coating the interior of the metal container are generally heat-curable, resinous materials which are applied in the form of a solution or dispersion in a volatile organic solvent. The wet-coated metal surface is passed through an oven in which hot air is circulated to evaporate the solvent and to cure the coating material to the required hardness. The removal of the organic solvent creates an air pollution problem which many present day communities will not tolerate.

Among the various methods which have been proposed to avoid the use of organic solvents in preparing synthetic resin coatings for metal surfaces is to formulate the coating as an aqueous dispersion.

Aqueous dispersions of polymers having reactive carboxyl groups and heat curable, thermosetting resins have been proposed by the art as metal coatings, e.g. 2,902,390, U.S. 2,954,358, U.S. 3,053,693, U.S. 3,094,435, 3,107,227, U.S. 3,378,477, U.S. 3,403,088 and 3,466,347. These coating materials have not found wide commercial application in the food container industry as many of these coatings are not sufficiently abrasion resistant to withstand the mechanical handling that coated containers undergo during manufacture. For example, in the manufacture of aluminum cans for carbonated beverages, aluminum blanks are subjected to a metal extrusion operation termed "drawing and ironing." The extruded can is then washed with cleaning reagents and scrubbed with stainless steel brushes to remove oil and other foreign material which may adhere to the can body. After the cleaning operation, the cans are dried and are conveyed, by the steel scrub brushes to a decorating station where the exterior of the can is decorated and baked to dry the printed indicia applied to the can exterior. After the cans are decorated, a corrosion resistant coating is applied to the can interior. Although it would be economically advantageous to coat the can interior before decorating and thereafter baking the can to simultaneously dry the printing and harden the coating, this procedure is not followed as most coating materials do not have sufficient abrasion resistance to withstand the scratching and other interruptions formed therein by the steel brushes used to convey the cans to the decorating station. It is extremely critical that any coating applied to the interior of the container be as free of interruptions as possible to avoid the consequences of corrosion of any exposed metal surfaces by the packaged product.

High can making speeds and reduced manufacturing costs could be realized with a coating material which could be applied to the can interior before decoration and withstand the abrasive effect of the equipment used to convey the cans to the decorating station. While some aqueous dispersed coating materials have come close to meeting the requirements of abrasion resistance required in container manufacture, none has heretofore been wholly satisfactory.

SUMMARY OF THE INVENTION

In accordance with the present invention, there is provided, dispersed in an aqueous medium, a coating composition for application to metal surfaces to provide an adherent, abrasion resistant coating film, which coating composition is comprised of a mixture of a carboxyl containing olefin copolymer and a heat curable, thermosetting, modified urea formaldehyde resin selected from alkylated urea formaldehyde condensates and methylolated alkeneureas.

As will hereinafter be illustrated, the aqueous coating compositions of the present invention when applied to metal surfaces such as aluminum, provide a coating film of sufficient abrasion resistance that the coating compositions can be applied to the interior of cans subjected to handling by stainless steel brushes.

PREFERRED EMBODIMENTS

The term "carboxyl containing olefin copolymer" as used herein includes within its meaning copolymers of $\alpha$-olefins with an ethylenically unsaturated carboxylic acid. The $\alpha$-olefins employed in the copolymer are $\alpha$-olefins which have the general formula $RCH=CH_2$ wherein R is either a hydrogen or an alkyl group having from 1 to 8 carbon atoms. Typical examples of suitable olefins include ethylene, propylene, butene-1, heptene-1, and 3-methylbutene-1. The concentration of the $\alpha$-olefin in the copolymer is in the range of about 70 to about 90 weight percent and the concentration of acidic monomer is from about 10 weight percent to about 30 weight percent, and preferably, from 15 to 25 weight percent.

The ethylenically unsaturated carboxylic acid component of the copolymer is an $\alpha,\beta$-ethylenically unsaturated carboxylic acid having from 3 to 8 carbon atoms. Examples of such acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate, and maleic anhydride. Although maleic anhydride is not a carboxylic acid in that it has no hydrogen attached to the carboxyl groups, it can be considered an acid for the purposes of the present invention because of its chemical reactivity being that of an acid. In the practice of the present invention, carboxyl containing olefin copolymers prepared from acrylic acid and methacrylic acid are preferred.

The carboxyl containing olefin copolymer need not necessarily be a two component polymer. Thus, although the olefin content of the copolymer should be about 70 to about 90 weight percent, more than one olefin can be employed to provide the hydrocarbon nature of the copolymer base. Additionally, any third copolymerizable monomer can be employed in combination with the olefin and the ethylenically unsaturated acid comonomer. The scope of copolymers suitable for use in the present invention is illustrated by the following examples: ethylene/acrylic acid copolymers, ethylene/methacrylic acid copolymers, ethylene/itaconic acid copolymers, ethylene/maleic acid copolymers, ethylene/acrylic acid/methyl methacrylate copolymers, ethylene/methacrylic acid/ethyl acrylate copolymers, ethylene/propylene/acrylic acid copolymers, ethylene/vinyl chloride/acrylic acid copolymers, polyethylene/acrylic acid graft copolymers, polyethylene/methacrylic acid graft copolymers, polypropylene/acrylic acid graft copolymers and polypropylene/methacrylic acid graft copolymers.

The heat curable, thermosetting modified urea formaldehyde resins used in combination with the carboxyl containing olefin copolymers of the present invention are alkylated urea formaldehyde condensates and methylolated alkeneureas. Illustrative of the alkylated urea formaldehyde condensates are the methylated dimethylol ureas such as methoxymethyl urea, dimethoxymethyl urea and trimethoxymethyl urea and the uron resins. The uron resins are known to the art and are prepared by the condensation of urea with formaldehyde to form initially tetramethylol urea. Dehydration of tetramethylol urea, with elimination of one mole of water between two adjacent N,N'-methylol groups, yields a monocyclic N,N'-bis(methylol) ring compound of the formula

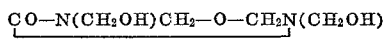

namely, N,N'-bis(methylol) uron. The two methylol groups of N,N'-bis(methylol) uron are then etherified by acidic reaction with an aliphatic alcohol having 1 to 2 carbon atoms as for example, methanol, ethanol, to yield a N,N'-bis(alkoxymethyl) uron of the general formula

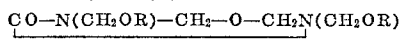

wherein R is an alkyl group having 1 to 2 carbon atoms. The preparation of such uron resins has already been described by Kadowaki [Bull. Chem. Soc. (Japan) 11, 248–61 1936)].

The dimethyl ether of N,N'-bis(dimethylol) uron, N,N'-bis(methoxymethyl) uron is a uron resin preferred in the practice of the present invention. N,N'-bis(methoxymercially. For example, Rhonite R–1, a product of Rohm and Haas Company under the trade name Rhonite R–2.

Illustrative of the methylolated alkeneureas are dimethylol ethyleneurea, dimethylol 1,2-propyleneurea and 1,3-propyleneurea.

Methylolated ethyleneurea resins are available commercially. For example, Phonite R–1, a product of Rohm and Haas is N,N' dimethylol ethyleneurea, a condensate of ethyleneurea and formaldehyde.

It is an essential and critical feature of the present invention that a modified urea formaldehyde resin of the type above described be used in combination with the carboxyl containing olefin copolymer. As will hereinafter be illustrated if a modified urea formaldehyde resin of the type described is not incorporated in the aqueous coating compositions of the present invention or if an aminoplast resin other than the modified urea formaldehyde resins of the present invention are used, the applied coating will not have sufficient abrasion resistance to withstand the handling operations involved in metal container manufacture.

The aqueous dispersions used in the practice of the present invention are prepared by dispersing the carboxyl containing olefin copolymer in an aqueous liquid system containing an amount of an alkaline compound sufficient to effect a dispersion, as the carboxyl containing olefin copolymers are normally insoluble and are not readily dispersible in water.

The alkaline compound is present in the aqueous coating dispersions of the present invention in an amount sufficient to neutralize a major amount of the carboxylic acid units present in the carboxyl containing olefin copolymer. Generally, the amount of alkaline material required to effect a stable dispersion is in the range of about 0.5 to about 1.0 stoichiometric equivalents per carboxyl group in the carboxyl containing copolymer.

Among the various alkaline compounds which may be employed as neutralizing reagents to prepare the dispersions of the present invention are ammonia, ammonium hydroxide, monoalkyl amines such as ethyl amine and propylamine, secondary and tertiary amines, such as dimethylamine and trimethylamine, diethyl and triethyl amine and the like, monoalkanol amines, such as ethanolamine and propanolamine, and polyalkanolamines such as di- and triethanolamine, monocycloalkyl amines such as cyclohexylamines, and monocycloalkano amines such as cyclohexanol amine and diamines such as ethylenediamine and hexamethylenediamine. In addition, certain strong heterocyclic monoamines are also suitable as alkaline dispersing agents, such as morpholine, and pyridine. However, $NH_4OH$ usually gives the best results in the simplest way and is accordingly, preferred.

The solids content of the coating compositions of the present invention are comprised of about 50 to about 90% by weight and preferably about 65 to about 75% by weight of the carboxyl acid containing olefin copolymer and about 10 to about 50% by weight and preferably about 25 to about 40% by weight of the modified urea formaldehyde resin.

The coating compositions of this invention can be satisfactorily applied at a solids content ranging from about 1% to about 45% by weight, based on the total weight of the aqueous dispersion. Generally, a solids content of about 2 to about 10% by weight is preferred.

The aqueous coating compositions of the present invention can be satisfactorily applied to metal surfaces by any of the conventional methods employed by the coating industry. However, for coating the walls of metal containers, rinse coating is a preferred method. For general coating purposes, roll, spray and flow coating are also useful methods of application.

After applying the coating, the applied coating is cured by heating the coated metal substrate at a temperature of about 350° F. to about 450° F. for a period of about 1 to 10 minutes.

The preferred coating weight for coating the interior walls of metal containers with an adequately protective organic coating suitable for carbonated beverages is in the range of 0.1 to 5 milligrams of carboxyl containing olefin copolymer coating per square inch of exposed metal surface.

The present invention is illustrated, but not limited, by the following example.

EXAMPLE

Thirty grams of 28% ammonium hydroxide was added to 189 grams of an 85% aqueous solution of N,N'-bis(methoxymethyl)uron. To this mixture was added 1500 grams of a 20% aqueous disperison of an ammonium salt of an ethylene/acrylic acid copolymer (E/AA) containing 80 percent by weight ethylene and 20 percent by weight acrylic acid having a melt index of 300 (ASTM D–1238) to prepare an aqueous coating dispersion.

The aqueous coating dispersion was dip coated on the inner walls of container bodies fabricated from aluminum blanks of the type conventionally employed in the fabrication of carbonated beverage containers to provide coating films having a film weight of 0.5 to 0.9 milligram per square inch. The coated container bodies were baked for 4 minutes at an oven temperature of about 385° F.

The procedure of the example was repeated with other modified urea formaldehyde resins being substituted for the N,N'-bis(methoxymethyl)uron.

The abrasion resistance of the coatings were evaluated by the following test procedure:

A round stainless steel wire brush used to convey metal cans from the cleaning station to drying ovens, having a diameter slightly larger than the diameter of the cans, was inserted into the can while giving the brush a one-quarter turn twist. The same procedure was repeated while withdrawing the brush. After removal of the brush, the can was filled with a ferric chloride-potassium ferricyanide solution for two minutes and then rinsed and dried. Blue scratches were observed if the wires of the brush penetrated the coating.

The abrasion resistance of container bodies coated with ethylene/acrylic acid copolymer aqueous coating dispersions containing a variety of modified urea formaldehyde resins in accordance with the procedure of the example is recorded in the table below.

For purposes of contrast, as a control test, container bodies which had been coated in a manner similar to that of the example but to which a modified urea formaldehyde resin had not been added to the coating dispersion or an aminoplast resin or a carboxylated resin outside the scope of the invention was substituted for the modified urea formaldehyde resin or the E/AA resin used in the example were also subjected to the abrasion test. The results of these control tests (designated by the symbol "C") are also listed in the table.

TABLE

| Test No. | E/AA solids conc., wt. percent | Aminoplast resin | Aminoplast solids conc., wt. percent | Abrasion test,[1] number of scratches |
|---|---|---|---|---|
| 1 | 70 | N,N'-bis(methoxymethyl) uron. | 30 | 0. |
| 2 | 70 | Methoxymethyl urea [2] | 30 | 1. |
| 3 | 70 | Dimethylol ethylene urea. | 30 | 1. |
| C$_1$ | 100 | | 0 | 2 or more. |
| C$_2$ | 70 | Hexamethyoxymethyl-melamine. | 30 | Do. |
| C$_3$ | 70 | Methoxymethyl melamine resin. | 30 | 4 or more. |
| C$_4$ | 70 | Hydroxymethyl urea resin. | 30 | Unstable composition.[3] |
| C$_5$ | [4] 70 | N,N'-bis (methoxymethyl) uron. | 30 | 2 or more. |

[1] Average of 30+ tests.
[2] Mixture of mono-, di-, and trimethoxymethyl urea.
[3] Coating composition precipitated out of solution after a few days of standing at room temperature.
[4] Carboset 514H an ethyl acrylate/methylmethacrylate/methacrylic acid terpolymer having 10% reactive carboxyl acid groups manufactured by B. F. Goodrich, used in place of ethylene/acrylic acid copolymer By reference to the table, it is immediately apparent that aluminum container bodies coated with ethylene/acrylic acid copolymer dispersions having a modified urea formaldehyde resin incorporated therein in accordance with the present invention exhibit superior abrasion resistance when compared to container bodies coated with a carboxyl containing olefin copolymer dispersions in which such modified urea formaldehyde resins are absent, or a carboxylated resin other than a carboxyl containing olefin copolymer is used.

What is claimed is:

1. A coating composition suitable for coating metal surfaces comprising an aqueous dispersion having dispersed therein a mixture of (1) about 50 to about 90% by weight of a carboxyl acid containing olefin copolymer having reactive carboxyl groups containing about 70 to about 90 weight percent of an olefin having the general formula $RCH=CH_2$ wherein R is selected from the group consisting of hydrogen and an alkyl group having 1 to 8 carbon atoms and about 10 to about 30 weight percent of an $\alpha,\beta$-ethylenically unsaturated carboxylic acid having 3 to 8 carbon atoms and (2) about 10 to about 50 percent by weight of a heat curable, thermosetting modified urea formaldehyde resin selected from the group consisting of a N,N'-bis(alkoxymethyl)uron and a methylolated alkene-urea.

2. The coating composition of claim 1 wherein the $\alpha$-olefin is ethylene.

3. The composition of claim 1 wherein the ethylenically unsaturated carboxylic acid is selected from the group consisting of acrylic and methacrylic acid.

4. The coating composition of claim 1 wherein the N,N'-bis(alkoxylmethyl)uron is N,N'-bis(methoxymethyl) uron.

5. The coating composition of claim 1 wherein the modified urea formaldehyde resin is N,N' dimethylol ethylene urea.

6. The coating composition of claim 1 wherein the mixture comprises 1 to about 45 percent by weight of the aqueous dispersion.

7. The coating composition of claim 1 containing an amount of an alkaline compound sufficient to neutralize a major portion of the reactive carboxyl groups.

8. The coating composition of claim 1 wherein the alkaline compound is ammonium hydroxide.

References Cited

UNITED STATES PATENTS

| 3,392,131 | 7/1968 | Miles et al. | 260—29.4 UA |
| 3,214,488 | 10/1965 | O'Donnell et al. | 260—29.4 UA |
| 3,544,507 | 12/1970 | Lloyd | 260—851 |
| 3,622,442 | 11/1971 | Reardon | 260—29.4 UA |

LORENZO B. HAYES, Primary Examiner

U.S. Cl. X.R.

260—851; 117—132 A